United States Patent
Bhavanam et al.

(10) Patent No.: US 9,143,408 B2
(45) Date of Patent: Sep. 22, 2015

(54) INTERPROVIDER VIRTUAL PRIVATE NETWORK PATH IDENTIFICATION

(75) Inventors: Kotilingareddy Bhavanam, Bangalore Karnataka (IN); Swamy Jagannadha Mandavilli, Fort Collins, CO (US); Venkatesh Mahalingam, Bangalore Karnataka (IN); Muthukumar Suriyanarayanan, Bangalore Karnataka (IN); Anuradha Venkataraman, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/561,430

(22) Filed: Jul. 30, 2012

(65) Prior Publication Data

US 2014/0029443 A1    Jan. 30, 2014

(51) Int. Cl.
  H04L 12/28    (2006.01)
  H04L 12/24    (2006.01)
  H04L 12/703   (2013.01)
  H04L 12/713   (2013.01)
  H04L 12/715   (2013.01)

(52) U.S. Cl.
  CPC .............. H04L 41/12 (2013.01); H04L 45/28 (2013.01); H04L 45/04 (2013.01); H04L 45/586 (2013.01)

(58) Field of Classification Search
  CPC ................................ H04L 45/60; H04L 45/00
  USPC .................................. 370/228, 289, 328, 244
  See application file for complete search history.

(56) References Cited

U.S. PATENT DOCUMENTS

| | | | |
|---|---|---|---|
| 7,467,215 B2 | 12/2008 | Ould-Brahim | |
| 7,535,828 B2 | 5/2009 | Raszuk et al. | |
| 7,643,434 B2 | 1/2010 | Mandavilli et al. | |
| 7,876,694 B2 | 1/2011 | Menon et al. | |
| 7,953,097 B2 | 5/2011 | Hart et al. | |
| 7,975,180 B2 | 7/2011 | Sajassi et al. | |
| 8,014,275 B1 * | 9/2011 | Sundt et al. ................... | 370/217 |
| 2007/0091796 A1 * | 4/2007 | Filsfils et al. ................. | 370/228 |
| 2008/0062986 A1 * | 3/2008 | Shand et al. ................... | 370/392 |
| 2008/0130627 A1 * | 6/2008 | Chen et al. ..................... | 370/351 |
| 2008/0181219 A1 * | 7/2008 | Chen et al. ..................... | 370/389 |
| 2009/0154373 A1 | 6/2009 | Ye et al. | |
| 2010/0034112 A1 * | 2/2010 | Kamuro et al. ............... | 370/252 |
| 2010/0046531 A1 * | 2/2010 | Louati et al. .................. | 370/401 |
| 2010/0238808 A1 | 9/2010 | Salam et al. | |
| 2010/0278073 A1 | 11/2010 | Bhavanam et al. | |
| 2011/0274111 A1 | 11/2011 | Narasappa et al. | |
| 2012/0120793 A1 * | 5/2012 | Corti ............................. | 370/228 |
| 2013/0201909 A1 * | 8/2013 | Bosch et al. ................... | 370/328 |

OTHER PUBLICATIONS

Inferring the existence of CE routers, IBM Tivoli Network Manager IP Edition, Version 4.1, retrieved Mar. 10, 2015, 1 page.

* cited by examiner

*Primary Examiner* — Parth Patel
(74) *Attorney, Agent, or Firm* — Rathe Lindenbaum LLP

(57) ABSTRACT

An inter-provider virtual provider network path is identified by identifying a provider network provider edge router having a provider edge interface serving, obtaining routing information from the provider edge router, identifying, from the routing information, a remote customer edge interface of a customer edge router connected to the provider edge router by an intermediate service provider, and identifying the path and associated links between the identified provider edge interface and the identified remote customer edge interface.

15 Claims, 5 Drawing Sheets

INTERPROVIDER VIRTUAL PRIVATE NETWORK PATH IDENTIFICATION

BACKGROUND

In circumstances where a service provider does not have a point of presence in a geographical location, connections between the service provider and an edge router of a customer network in the geographical region may be facilitated using one or more intermediate service providers. The discovery and management of such customer edge connections in such inter-provider virtual private networks may be extremely complex as there is no direct connectivity between the service provider and the customer edge router. As a result, the identification of a failed link in a logical path between the service provider and the customer edge router is difficult.

DETAILED DESCRIPTION OF THE EXAMPLE IMPLEMENTATIONS

Figure 1:
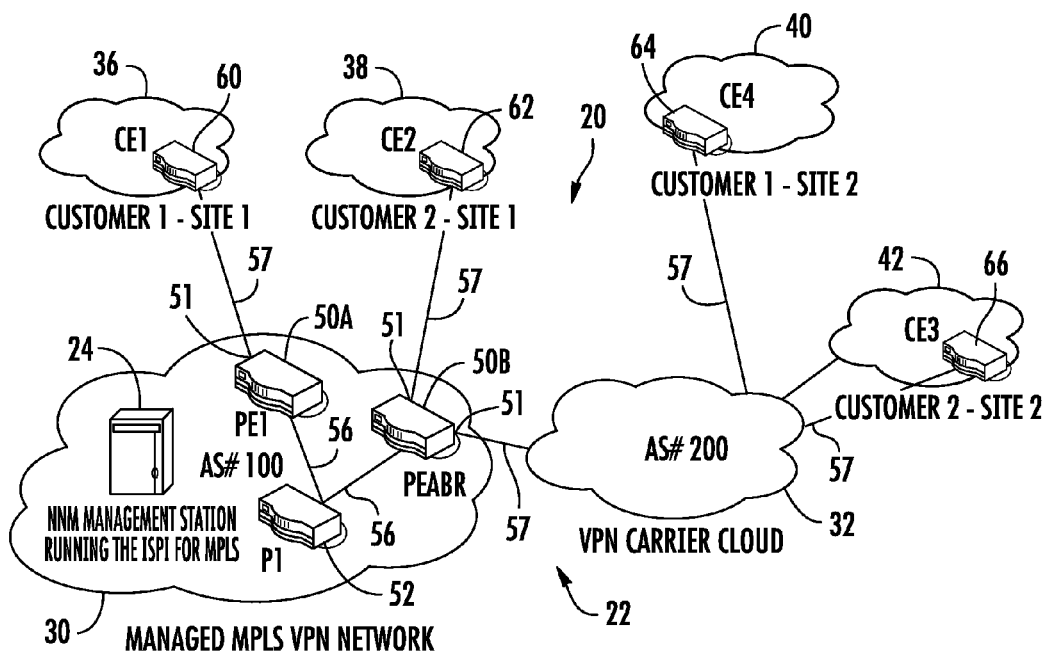
FIG. 1 is a schematic illustration of an example interprovider virtual private network.

FIG. 1 schematically illustrates an example interprovider virtual private network 20. As will be described hereafter, interprovider virtual private network 20 provides an inter-provider virtual private network where connections between a service provider and an edge router of a customer network in the geographical region may be facilitated using one or more intermediate service providers. As will be described hereafter, network management system 24 facilitates the discovery and identification of an inter-provider virtual private network path and associated links, further facilitating the identification of a failed link in the path between the service provider and the customer edge interface.

Interprovider virtual private network 20 comprises operating environment 22 and network manager 24. Operating environment 22 comprises a managed virtual private network such as a managed multiprotocol label switching environment wherein data from one network node is directly carried to another network node. Operating environment 22 comprises a local internet service provider (ISP) network 30, one or more intermediate third-party virtual private network (VPN) carrier clouds or internet service providers 32 and customer networks including local custom networks or local network clouds 36, 38 and remote networks or remote clouds 40, 42.

Local service provider network 30 comprises a multiprotocol label switching (MPLS) network connected to each of customer networks 36, 38, 40 and 42. In one implementation, local service router network 30 comprises a MPLS VPN, such as a Layer 3 (L3VPN) service provider network. In other implementations, network 30 may comprise other forms of a service provider network.

Network 30 comprises one or more provider edge (PE) interface devices or routers 50A, 50B (collectively referred to as routers 50) and one or more in network or backbone interface devices or routers 52. For example, such routers 50, 52 may comprise label switch routers or LSR's. Such LSR's perform routing within the provider network 30 based on labels assigned to packets of data and across logical interconnections or paths 56 such as Label Switch Paths (LSPs). Such LSRs perform routing with respect to customers outside the provider network across paths 57 using routing protocols. In one implementation, such interconnections are established with a routing protocol such as Border Gateway Protocol (BGP), more particularly External Border Daily Protocol (eBGP) and other protocols such as Open Shortest Path First (OSPF), Routing Information Protocol (RIP), Enhanced Interior Gateway Routing Protocol (EIGRP), static route and the like. In the example illustrated, as indicated by communication lines 57, provider edge router 50A is connected to local customer networks 36 via a provider edge port or interface 51 while provider edge router 50B comprises a provider edge area border router (PEABR) connected to customer networks 40, 42 via provider edge port or interface 51 and using one or more intermediate service providers or carrier clouds, such as service provider 32 (identified by an autonomous system number (AS#)). In the example illustrated, provider edge router 50B is also connected to a local customer 38 via a provider edge port or interface 51.

Intermediate service provider 32 comprises a service provider through which provider edge router 50B communicates with customer networks 40, 42. Intermediate service provider 32 may itself include one or more provider edge (PE) router devices or routers and one or more backbone devices (P) or routers similar to service provider network 30. Likewise, intermediate service provider 32 may service local customer networks through corresponding customer edge (CE) routers or devices.

Customer networks 36, 38 comprise customer networks which are directly connected to service provider network 30. Customer networks 36, 38 comprise customer edge routers devices 60, 62, respectively. In other implementations, customer edge router devices 60, 62 may comprise other networking devices for such customer networks.

Customer networks 40, 42 comprise customer networks that receive services from service provider network 30 which are connected to service provider network 30 through one or more intermediate service providers 32. Customer networks 40, 42 comprise customer edge routers 64, 66, respectively. Customer edge routers 64, 66 communicate with devices located on the particular customer networks 40, 42, respectively.

Customer networks 40, 42 may be in a distinct geographical region where service provider operating service provider network 30 does not have a point of presence. For example, a service provider, such as the service provider operating service provider network 30, may be located in the United States, wherein a customer network, such as customer network 40 and 42, may be located in India. Although the service provider operating service provider network 30 may not have a point of presence in India, the service provider operating service provider network 30 may service such customer networks 40, 42 utilizing a local intermediate service provider network 32 having a point of presence in India. In such circumstances, because there is no direct connectivity between the provider edge interface device or router 50B and the remote customer edge (CE) and because the provider edge interface device 50 does not have management access to the different or intermediate internet service provider network 32, complexities and difficulties associated with the use of duplicate addresses across virtual private networks is aggravated. In particular, discovering and visualizing an overall topology or arrangement of links forming the logical path from the provider edge interface device 50B, across the one or more intermediate service provider 32, to the remote customer network 40, 42 is difficult, complicating and inhibiting the management in the identification of failed individual links in the logical path.

Figure 2:
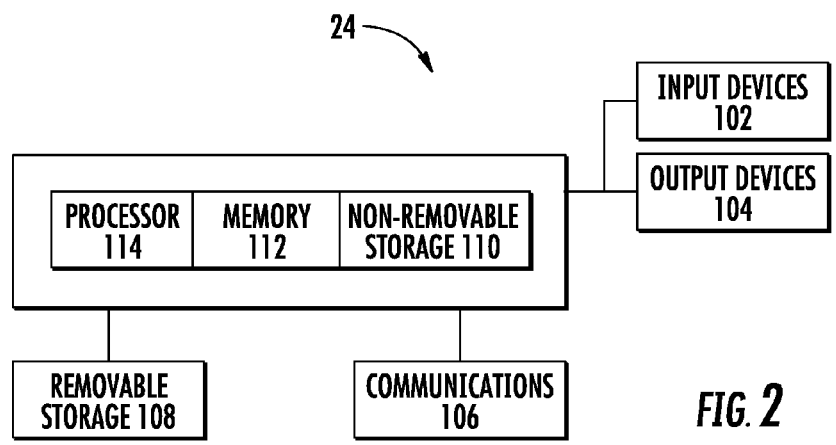
FIG. 2 is a schematic illustration of an example network manager of the interprovider virtual private network of FIG. 1.

Network manager 24 comprise a computing device that runs software applications to establish or manage interconnections among other features or aspects of provider network 30 for the suited purpose such as for a network-based MPLS/BGP virtual private network (VPN). FIG. 2 schematically illustrates one example of network manager 24. As shown by FIG. 2, network manager 24 comprises input devices 102, output devices 104, communications 106, removable storage 108, non-removable storage 110, memory 112 and processor 114.

Input devices 102 comprise one or more devices by which instructions or commands may be provided to network manager 24. Examples of input devices 102 include, but are not limited to, a touch screen, a keypad, a keyboard, a mouse, a stylus, a touchpad, a microphone with associated speech recognition software, buttons, switches and the like. Output devices 104 comprise a device by which output from network manager 24 is provided. Output device 104 may comprise a monitor or screen or may comprise a printer. In one implementation, in response to instructions or commands through input device 102, output devices 104 facilitates the display or visualization of an identified inter-provider virtual private network topology. As will be described hereafter, in one implementation, output device 104 further provides a notification as to which of the one or more interconnections or links of the path may have failed.

Communications 106 comprises those devices of network manager 24 which facilitate communication with provider network 30 or the elements or devices of provider network 30. For example, communications 106 may comprise one or more backbone routers in communication with network manager 24.

Removable storage 108, non-removable storage 110 and memory 112 comprise non-transient, non-transitory computer-readable mediums or persistent storage devices by which programming, code, instructions, program modules and/or data are stored. Examples of such persistent storage devices include, but are not limited to, magnetic or optical disk, solid-state memory, flash storage devices and the like.

Processor 114 comprises one or more processing units configured to carry out instructions stored or contained in one or more of memory 108, 110 and 112. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 114 may be embodied as part of one or more application-specific integrated circuits (ASICs). Unless otherwise specifically noted, the controller is not limited to any specific combination of hardware circuitry and software, nor to any particular source for the instructions executed by the processing unit.

Processor 114, following such instructions provided as part of a non-transient computer readable medium, monitors and administers provider network 30. In particular, processor 114 carries out the discovery, visualization and monitoring of customer edge routers 60, 62, 64 and 66 of customer networks 36, 38, 40 and 42, respectively. Processor 114 discovers customer edge routers, IP addresses and links between interfaces 50 and interfaces 60, 62, 64 and 66. The discovery of the connectivity between provider edge routers 50B and customer edge routers device 64 (or 66) facilitates management of the virtual private network. In particular, such discovery allows network manager 24 to monitor the customer edge notes/provider edge (PE)-customer edge (CE) links for faults, to visualize such links, and to detect service impact on customers due to faults in L3VPN. Such discovery further facilitates the running of IP SLA tests to determine troubleshoot problems in the connectivity between different service provider networks.

Figure 3:
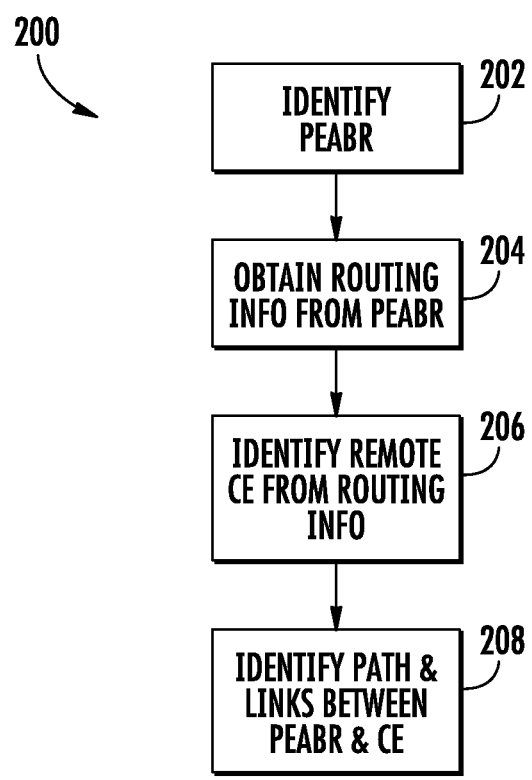
FIG. 3 is a flow diagram of an example method for identifying a virtual private network path.

FIG. 3 is a flow diagram of an example method 200 which may be carried out by network manager 24 in identifying the connections and links (connectivity) of a virtual private network in a provider path. As indicated by step 202, network manager 24 identifies a provider network provider edge router having a provider edge interface (port) serving as part of an intra-provider virtual private network path. In other words, network manager 24 identifies the provider edge area border router (PEABR). In the example illustrating FIG. 1, network manager 24 identifies router 50B as the PEABR. In one implementation, network manager 24 identifies the PEABR by consulting an MPLS-VPN-MIB table of each router of service provider network 30. In other implementations, the identification of each PEABR router may be determined in other fashions.

As indicated by step 204, for each PEABR router identified, network manager 24 obtains routing information from the PEABR. As indicated by step 206, network manager 24 uses the routing information to identify remote customer edge interfaces of customer edge routers connected to the provider edge interface. The identified PEABR, the identified remote CE edge router and its interface are start and socially used to identify link failures.

As indicated by step 208, using the identified PEABR and the identified remote CE interface, network manager 24 identifies an autonomous system (AS) path and links between the PEABR and the CE. The AS path identifies the one or more intermediate service providers or carrier clouds between the PEABR and the remote CE interface. The identified PEABR, the identified remote CE edge router and its interface, and the obtained AS path are stored for subsequent use in visualizing or displaying the topology or arrangement of the virtual private network. In those implementations where a specific display of the topology of the virtual private network 20 is not provided or where information regarding the specific number of intermediate service providers is not displayed, obtaining the AS path per step 208 may be omitted.

Figure 4:
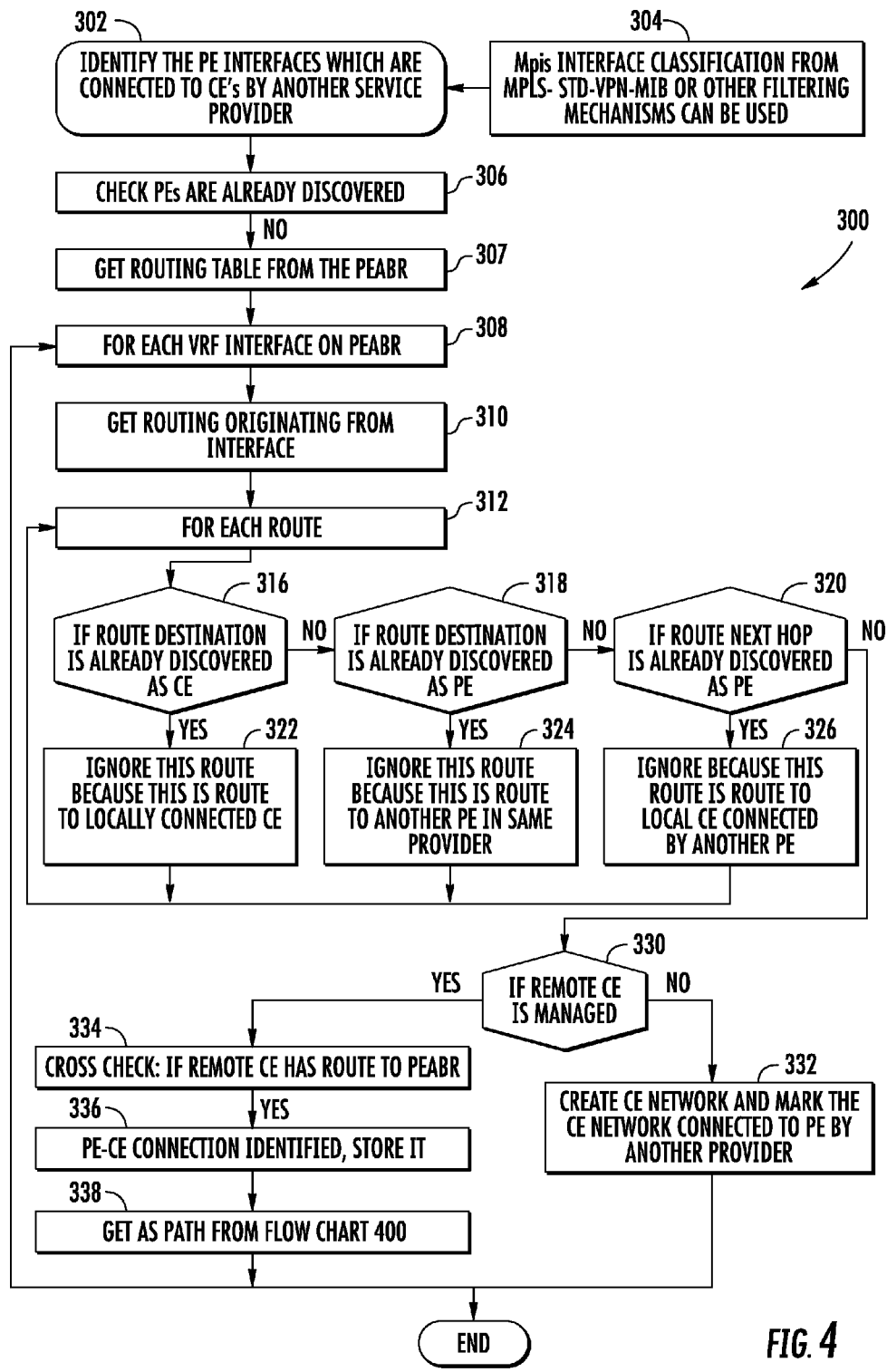
FIG. 4 is a flow diagram of another example method for identifying an inter-provider virtual private network path.

FIG. 4 is a flow diagram of an example method 300, a particular implementation of method 200, that may be carried out by network manager 24 to identify interfaces of an inter-provider virtual provider network and associated connections or links. With the method 300, such discovery happens in a provider network where network manager or network manager station 24 has access to the customer edge devices, where network manager 24 may make queries via simple network management protocol (SNMP) and where network manager 24 does not have access to other service provider networks, such as service provider network 32. As indicated by step 302, processor 114 carrying out instructions contained in at least one of memory 108, 110 and 112, identifies the one or more provider edge routers, which have a provider edge interface (also known as a provider edge port) that serves as part of an inter-provider virtual private network path. In the example illustrated, network manager 24 identifies router 50B (PE-ABR) routers) that is connected to customer networks through one or more intermediate third-party service provider networks.

The identification of the provider network PEABR serving as part of an inter-provider virtual private network may be achieved in various manners. In one implementation, network manager 24 determines whether a particular PE interface of a provider edge router of service provider network 30 is connected to a customer network through one or more intermediate third-party service provider networks by consulting a management information base table associated with the provider edge router. As illustrated by block 304, with respect to each provider edge interface (VRF interface) of the provider edge router, network manager 24 consults the MPLS Interface Classification from the MPLS-STD-VPN-MIB that has the "mplsL3VpnIfVpn Classification" MIB OID which supports the carrier of carrier, enterprise and inter-provider. In other implementations, other tables or filtering mechanisms may be utilized to determine which VRF interfaces are entry/exit points for service provider network 30 that are connected to a CE by another service provider.

In another implementation, network manager 24 may determine or identify those PE interfaces which are connected to CEs by another service provider using configuration details about service provider point of presence provided by the user. For example, network manager 24 may store in one of memory 108, 110, 112 A listing of points of presence for the service provider network 30. If a CE connected to a particular PE interface is not located within the geographic region of the point of presence, the particular PE interface may be identified as being connected to the CE by the other service provider.

In addition, as indicated by step 306, network manager 24 may check stored records in memories 108, 110, 112 for those interfaces (entry/exit points) that have been previously discovered as interfaces for inter-provider links. As indicated by step 307, for those PEABR's which have not been previously discovered, network manager 24 consults the routing table on each identified PEABR to identify the PE ports or interfaces 51.

As indicated by steps 308 and 310, once the PE interfaces serving as part of an inter-provider virtual private network path have been identified, the routes or paths originating from each of the PEABR to CE devices are obtained. In the example illustrated, such PEABR VRF routing details are obtained from the VRF routing table of the particular device (router) such as the MPLS-STD-VPN-MIB. In the example illustrated, network manager 24 does not consult the complete VRF routing table for each VPN customer of the PEABR, but just routes to the CE interfaces. In other words, network manager 24 ignores routes to networks outside the CE routers.

As indicated by step 312, for each VPN route originating from the PE interface serving as part of the inter-provider virtual private network path, network manager 24 identifies the links or connections between the PEABR device and the CE device. Each router path may be one of the following: (1) a route to a local CE device, (2) a route to another local PE device, (3) a route to a local CE device which is connected to another local PE device or (4) a route to a remote CE device which is connected to another PE device of any intermediate service provider. As indicated by steps 316, 318 and 320, network manager 24, by process of elimination, determines whether the particular route of interest is a route to remote CE device which is connected to a remote PE device of another service provider. In particular, as indicated by step 316, for each route, network manager 316 first determines whether the route has a destination which is already been discovered as a CE device. Network manager 24 consults memory, such as memory 108, 110, 112, to determine if the route destination has been previously discovered as a local CE. As indicated by step 322, if the route destination has been discovered as a local CE, the route is ignored and the next route originating from the PEABR device is examined.

Alternatively, as indicated by step 318, if the route is not a locally connected CE device, network manager 24 determines whether the destination of the route has already been discovered as a local PE device. Network manager 24 consults memory, such as memory 108, 110, 112, to determine if the route destination has been previously discovered as a local PE. As indicated by block 324, the route is ignored and the next route originating from the PEABR device is examined if the route is determined to be another PE router or device in the same provider network. One example method of identifying or discovering locally connected CE router devices and local PE router devices of the same service provider network 30 is described in co-pending U.S. patent application Ser. No. 12/776,740 filed on May 10, 2010 by Narasappa et al. and entitled EDGE LINK DISCOVERY, the full disclosure of which is hereby incorporated by reference. Those discovered local CE routers and local PE routers are recorded by network manager 24 in a memory such as memory 108, 10, 112.

As indicated by step 320, network manager 24 determines whether the route next hop has already been discovered as a local PE. In other words, network manager 24 determines whether the route extends from the PEABR to a local CE router which is connected to another local PE router. As indicated by block 326, if the route next hop as previously been discovered as a local PE router (a router directly connected to a local CE router), the route is also identified as not being to a remote CE connected to another service provider PE.

As indicated by step 330, if the particular route being examined by network manager 24 does not satisfy any of the criteria of step 316, 318 and 320, the route or path is determined to be to a remote CE router which is connected to a remote service provider. In other words, the route is determined to be an inter-provider VPN path extending from the PEABR. In step 330, network manager 24 determines whether the identified remote CE is managed. In other words, network manager 24 consults records in a memory, such as memory 108, 110, 112, or remote memory, to determine whether the particular identified remote CE is to be managed or monitored by network manager 24. As indicated by step 332, if the particular remote CE is not identified as being managed by network manager 24 (i.e., it is not on a list of managed CEs), network manager 24 creates or stores data representing a network having the remote CE and marks the remote CE network as being connected to the PEABR by another service provider. As a result, network manager 24 may avoid repeating the analytical steps regarding the particular remote CE and remote CE network, reducing the time and processing power consumed for subsequent identification of other inter-provider VPN paths.

As indicated by step 334, network manager 24 performs a cross check by determining if the remote CE router has a path or route back to the PEABR. In one implementation, network manager 24 consults the IP Route table of the remote CE. In other implementations, the cross checked may be achieved in other fashions.

As indicated by step 336, if the crosscheck is positive, if the remote CE has a route to the PEABR, network manager 24 identifies and stores the PEABR to CE connection. As indicated by step 338, along with the PEABR-CE connection, network manager 24 also obtains and stores the autonomous system (AS) path for the connection. The AS path identifies the one or more intermediate service providers along the PEABR-CE path for subsequent display of the topology of virtual private network. In those implementations where such a display of the topology of the virtual private network is not provided, step 338 may be omitted.

Figure 5:
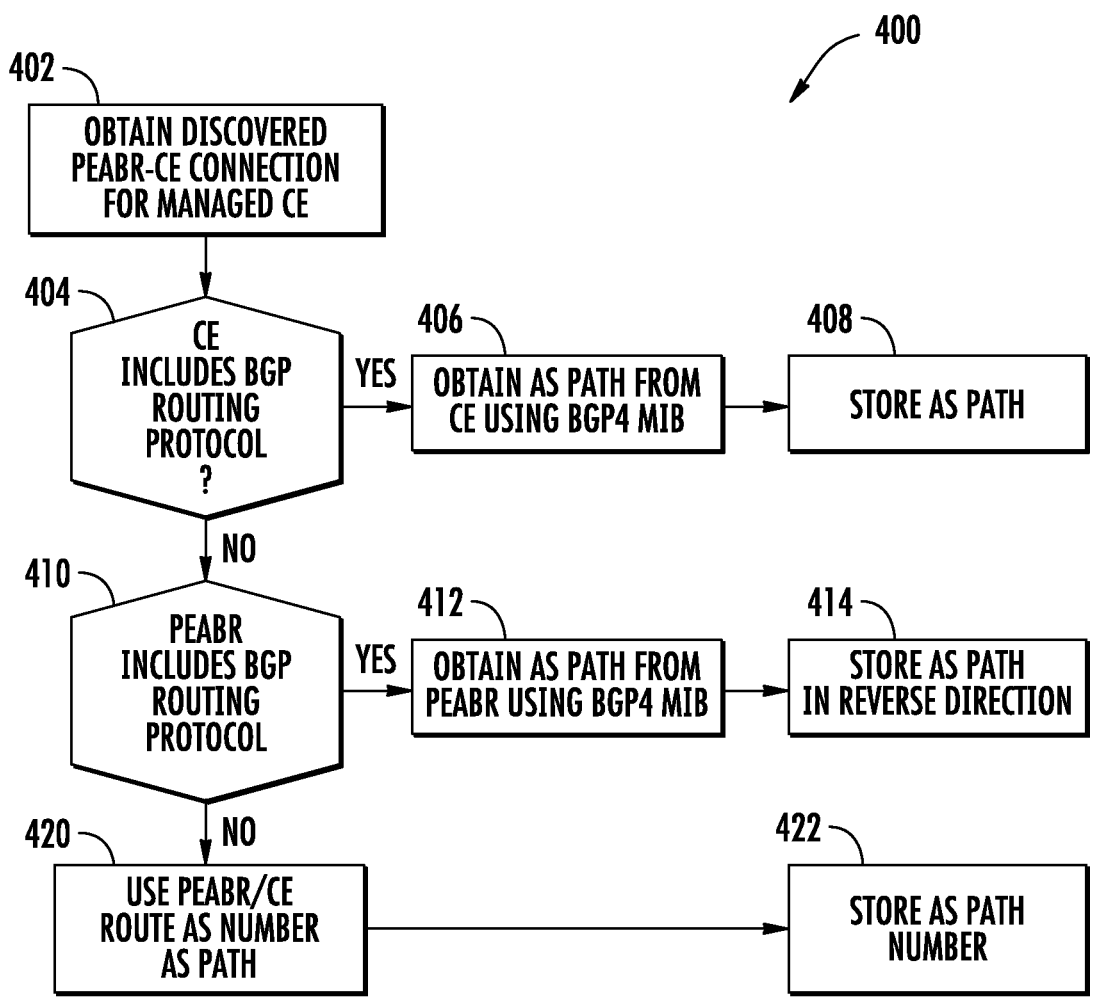
FIG. 5 is a flow diagram of an example method for identifying a hierarchy of Antonymous Systems (AS) in an identified inter-provider virtual private network path connectivity.

FIG. 5 is a flow diagram of an example method 400 for obtaining an AS Path for a PEABR-CE connection where the connection utilizes an inter-provider VPN. As indicated by step 402, memory manager 24 obtains discovered PEABR-CE connection for a managed remote CE (step 336 in method 300). As indicated by steps 404 and 406, if the remote CE is provisioned with BGP routing protocol, network manager 24 obtains the AS Path using the border Gateway protocol Level for management information base (BGP4 MIB). In one implementation, network manager 24 consults the management information base (MIB) object identifier (OID) called "bgp4PathAttrASPathSegment". As indicated in step 408, the obtained AS Path is stored for subsequent use.

As indicated in steps 410 and 412, if the remote CE does not include BGP routing protocol, network manager 24 attempts to obtain the AS Path from the PEABR. As indicated by step 412, if the PEABR-remote PE includes BGP routing protocol, network manager 24 obtains the AS Path, in the reverse direction, from the PEABR using the BGP4MIB from the PEABR. As indicated by step 414, the obtained AS Path (in the restriction) is stored for subsequent use.

As indicated by step 420, if the PEABR-remote PE is not provisioned with BGP routing protocol, network manager 24 utilizes the PEABR-CE route's AS number as the AS Path. As indicated by step 422, the PEABR-CE route's AS number is stored whenever manager 24 for subsequent use.

Figure 6:
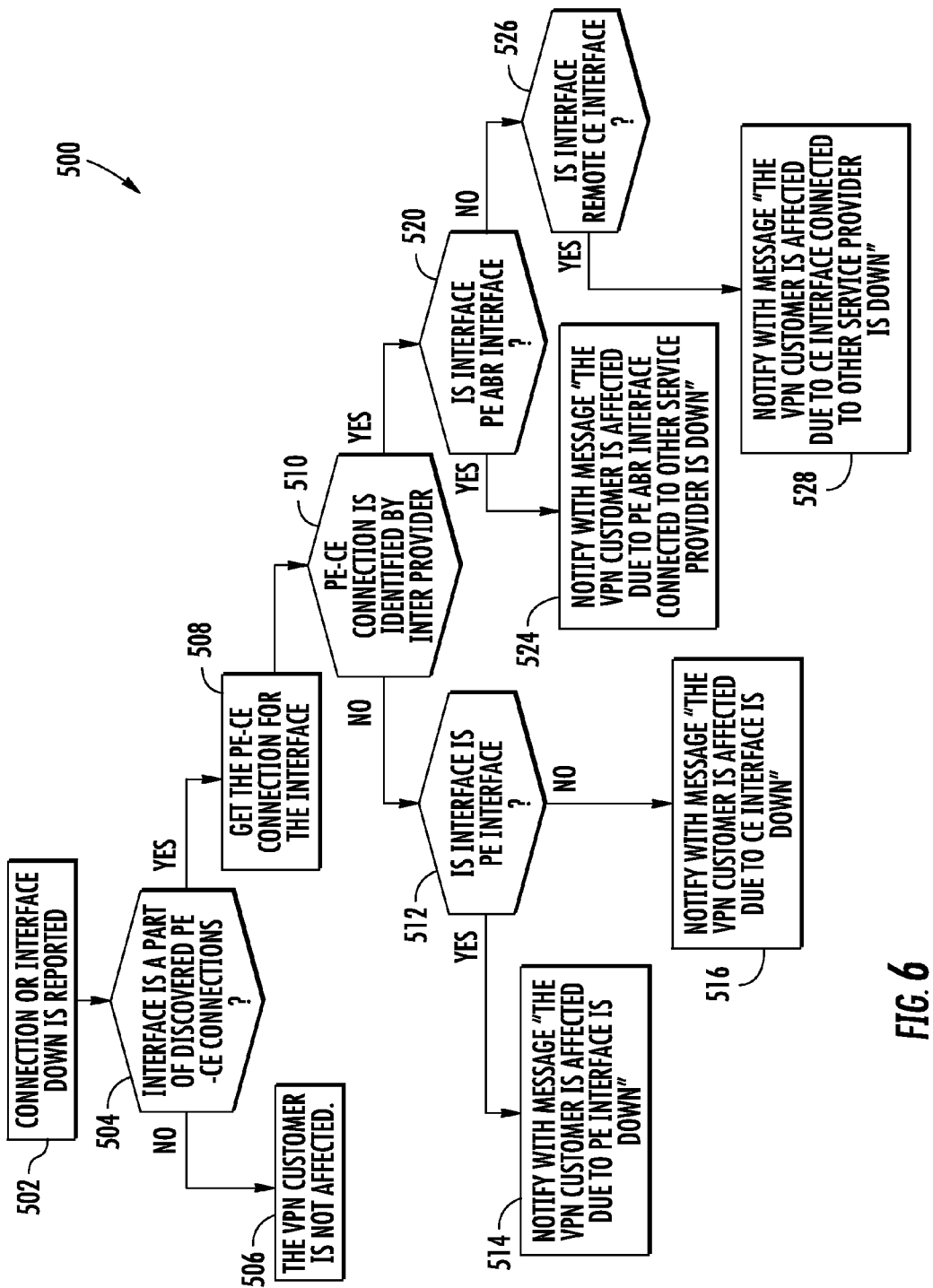
FIG. 6 is a flow diagram of an example method for identifying a link failure to an effected VPN customer using the identified inter-provider virtual private network path.

FIG. 6 is a flow diagram of an example method 500 for identifying a link failure to an effected customer CE using the identified inter-provider virtual private network path. As indicated by steps 502 and 504, upon a connection or interface failure being reported, network manager 24 determines whether the failure is part of a discovered PEABR-CE (remote) connection. As indicated by step 506, if the failure is not part of a discovered PEABR-CE (remote) connection, the failure is not part of the VPN and no action is taken.

Alternatively, as indicated by step 508, if the failure is part of a discovered PE-CE connection, network manager 24 data mines from the stored PEABR to remote CE path. As indicated by step 510, network manager 24 determines whether the PE-CE connection is identified by the third-party service provider (the inter-provider). As indicated by step 512, if the PE-CE connection cannot be identified by the inter-provider path identification step 300, network manager 24 determines whether the interface is a PE interface. As indicated by block 514, if the interface is a PE interface, network manager 24 displays an output device 104 a notification that the remote CE (the VPN customer) is affected by failure of the PE interface. Alternatively, as indicated by block 516, if the interface is not the PE interface, network manager 24 displays on output device 104 a notification that the communication failure with the remote CE is due to the CE interface failing.

As indicated by step 520, if the PE-CE connection cannot be identified by the inter-provider path identification per step 300, network manager 24 determines whether interface is a PEABR interface. As indicated by step 524, if the interface is identified by network manager 24 as a PEABR interface, network manager displays a notification on output device 104 that communication with the remote CE is due to the link between the PEABR and the other service provider failing. As indicated by step 526, if network manager 24 determines that the interface is not a PEABR interface, network manager 24 determines whether the interface is a remote CE interface. As indicated by step 528, if the interface is a remote CE interface, network manager 24 displays a notification on output device 24 that the communication failure with the remote customer is due to a failure of the link between the remote CE interface and the other service provider.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   identifying a provider network provider edge router having a provider edge interface serving as part of an inter-provider virtual private network path; obtaining routing information from the provider edge router; identifying, from the routing information, a remote customer edge interface of a customer edge router connected to the provider edge interface by an intermediate service provider; identifying the path and associated links between the identified provider edge interface and the identified remote customer edge interface; identifying a failing interface of the inter-provider virtual private network path using the identified path; and indicating: that the provider edge router is a cause of the failure if the failing interface has been identified as the provider edge interface of the provider edge router; that the customer edge router is a cause of the failure if the failing interface has been identified customer edge interface of the customer edge router; and that the cause of the failure is the intermediate service provider if the failing interface has not been identified as either the provider edge interface of the provider edge router or the customer edge interface of the customer edge router.

2. The method of claim 1, wherein the identity of the entry/exit interface serving as part of the path is obtained by consulting a management information base table of the entry/exit interface.

3. The method of claim 1, wherein the routing information is obtained from a virtual routing and forwarding (VRF) table of the provider edge router.

4. The method of claim 3, wherein the routing information is obtained by filtering out information other than routes to the remote customer edge interface from the provider edge router.

5. The method of claim 1, wherein the identification of the path comprises obtaining the path from a border gateway protocol management information base of the remote customer edge router.

6. The method of claim 1, wherein the identification of the path comprises obtaining the path from a border gateway protocol management information base of the provider edge router.

7. The method of claim 1, wherein the identification of the path comprises using a route number of the provider edge interface to the remote customer edge interface.

8. The method of claim 1, wherein the provider network provider edge interface is part of a provider network implemented in a multiprotocol label switching mechanism.

9. The method of claim 1, wherein the provider edge interface comprises a provider edge area border router of a first service provider in a first geographic region, wherein the customer edge router is part of a second service provider in a second geographical region distinct from the first geographic region and wherein the first service provider does not have a point of presence in the second geographic region.

10. The method of claim 1, wherein identifying the failed link failed link comprise identifying which link of a plurality of links has failed.

11. A non-transitory computer readable-device/memory containing code to direct a processor to: identify a provider network provider edge router having a provider edge interface serving as part of an inter-provider virtual private network path; obtain routing information from the provider edge router; identify, from the routing information, a remote customer edge interface of a customer edge router connected to the provider edge interface by an intermediate service provider; identify the path and associated links between the identified provider edge interface and the identified remote customer edge interface; identify a failing interface of the inter-provider virtual private network path using the identified path; and indicate: that the provider edge router is a cause of the failure if the failing interface has been identified as the provider edge interface of the provider edge router; that the customer edge router is a cause of the failure if the failing interface has been identified customer edge interface of the customer edge router; and that the cause of the failure is the intermediate service provider if the failing interface has not been identified as either the provider edge interface of the provider edge router or the customer edge interface of the customer edge router.

12. A network manager comprising: a processing unit; a memory storage device storing: code to direct the processing unit to: identify a provider network provider edge router having a provider edge interface serving as part of an inter-provider virtual private network path; obtain routing information from the provider edge router; identify, from the routing information, a remote customer edge interface of a customer edge router connected to the provider edge interface by an intermediate service provider; identify the path and associated links between the identified provider edge interface and the identified remote customer edge interface; identify a failing interface of the inter-provider virtual private network path using the identified path; and indicate: that the provider edge router is a cause of the failure if the failing interface has been identified as the provider edge interface of the provider edge router; that customer edge router is a cause of the failure if the failing interface has been identified customer edge interface of the customer edge router; and that the cause of the failure is the intermediate service provider if the failing interface has not been identified as either the provider edge interface of the provider edge router or the customer edge interface of the customer edge router.

13. The network manager of claim 12, further comprising a display, wherein the code further directs the processing unit to identify on the display a failed link of the identified path-using the identified path.

14. The network manager of claim 12, wherein the provider edge interface comprises a provider edge area border router of a first service provider in a first geographic region, wherein the customer edge router is part of a second service provider in a second geographical region distinct from the first geographic region and wherein the first service provider does not have a point of presence in the second geographic region.

15. The non-transitory computer readable-device/memory of claim 11, wherein the provider edge interface comprises a provider edge area border router of a first service provider in a first geographic region, wherein the customer edge router is part of a second service provider in a second geographical region distinct from the first geographic region and wherein the first service provider does not have a point of presence in the second geographic region.

* * * * *